United States Patent [19]
Dobbins

[11] 3,765,816
[45] Oct. 16, 1973

[54] APPARATUS FOR MOLDING PLASTIC
[75] Inventor: Walter James Dobbins, Lake Zurich, Ill.
[73] Assignee: American Can Company, New York, N.Y.
[22] Filed: Jan. 3, 1972
[21] Appl. No.: 214,786

Related U.S. Application Data
[62] Division of Ser. No. 856,346, Sept. 9, 1969, abandoned.

[52] U.S. Cl. .............................................. 425/246
[51] Int. Cl. .............................................. B29f 1/00
[58] Field of Search ............... 425/242, 246, 250, 425/356, 418, 423, 134, 129

[56] References Cited
UNITED STATES PATENTS
| | | | |
|---|---|---|---|
| 3,224,043 | 12/1965 | Lameris et al. | 425/246 X |
| 3,271,499 | 9/1966 | Schwaiger | 425/117 X |
| 2,777,166 | 1/1957 | Morin | 425/175 X |
| 3,507,010 | 4/1970 | Doleman et al. | 425/134 |

Primary Examiner—J. Spencer Overholser
Assistant Examiner—David S. Safran
Attorney—Robert P. Auber et al.

[57] ABSTRACT

A method and machine for the injection molding of articles interlinked in the form of continuous chains or webs. A fixed or stationary mold section cooperates with a plurality of movable mold sections which are carried on a rotatable turret which is indexed cyclically to present the movable mold sections sequentially in cooperating relationship to the fixed mold section to create the mold cavities for successive cycles. The cavity portions in each of the movable mold sections connect with those in the succeeding movable mold section in end-to-end relationship. As a result, at the end of each molding cycle, the batch of molded articles is carried away from the fixed mold section by rotation of the turret, but its trailing end remains in communication with the mold cavities which are being filled in the succeeding molding cycle so that the leading end of the next batch of articles fuses to it to form one or more continuous chains of articles.

11 Claims, 9 Drawing Figures

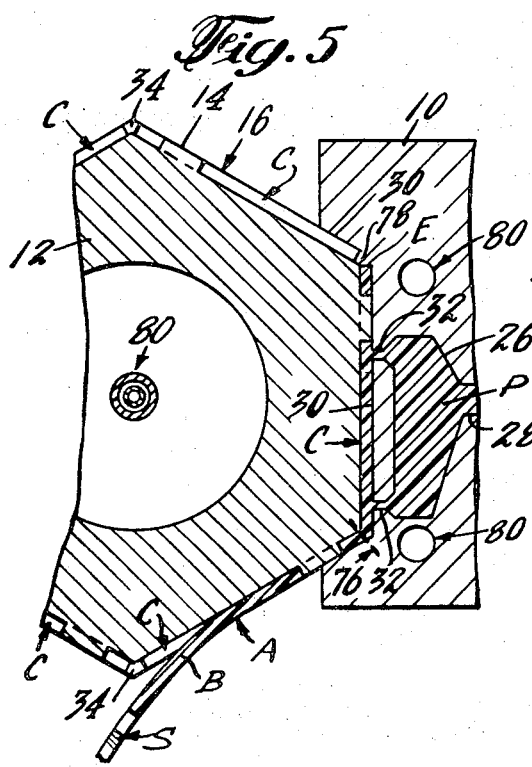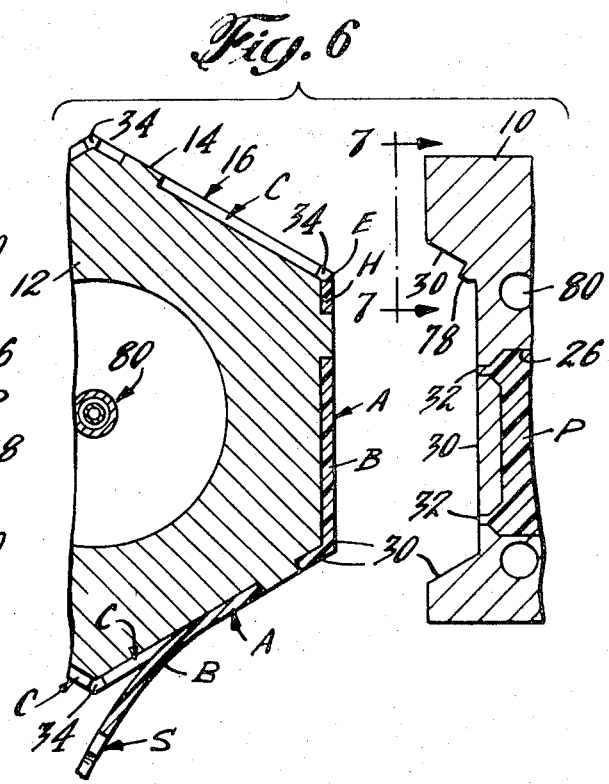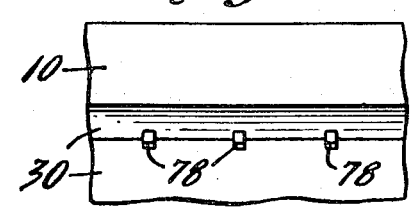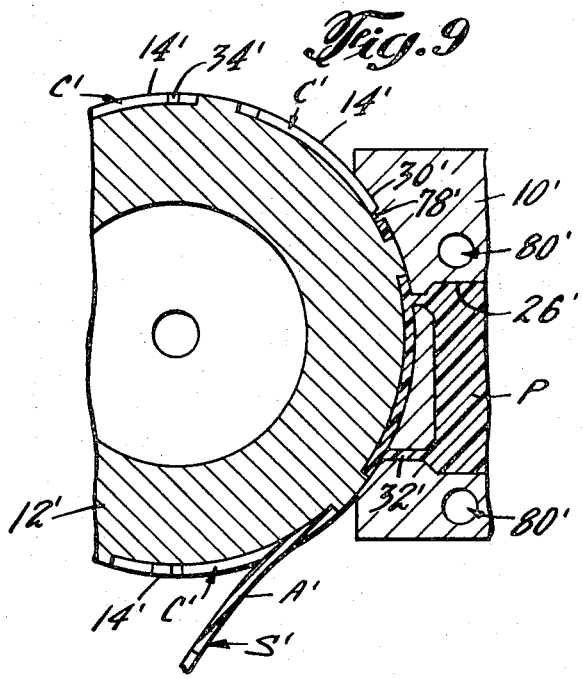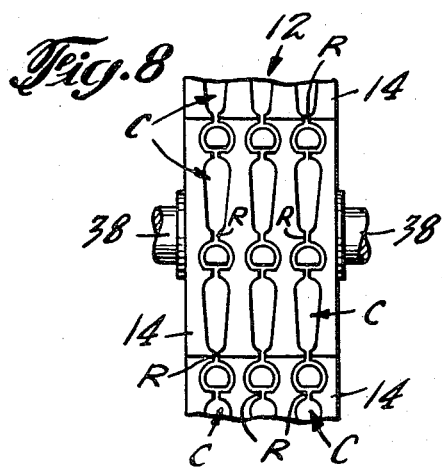

APPARATUS FOR MOLDING PLASTIC

This is a division of application Ser. No. 856,346, filed Sept. 9, 1969, now abandoned.

BACKGROUND OF THE INVENTION

In the production of injection molded thermoplastic products, the products or articles have heretofore generally been formed individually or in multi-article batches within an injection mold. Each time the injection molding process was cycled, a predetermined number of articles were formed, but since these had no physical connection to the articles formed in the preceeding cycle, they were difficult to handle and feed into subsequent machines, when such a step was required. The present invention solves this problem by providing a method and apparatus for molding such articles in the form of a continuous chain (or chains) of indefinite length which can be easily handled and which provides the means whereby the articles in the chain can be indexed and fed into subsequent machines.

Accordingly, it is an object of the present invention to produce articles continuously interlinked in the form of one or more continuous chains, or a web of cross-linked continuous chains.

It is also an object of the present invention to provide a method and arrangement for producing such continuously-linked articles through the use of a mold having a stationary section and a plurality of movable sections which may be sequentially indexed.

It is furthermore an object of the present invention to produce continuously-linked articles in the aforementioned manner by fusing the injection molded articles produced during any one cycle of operation, which the article produced during the previous cycle.

It is, moreover, a specific object of the present invention to provide a method and arrangement for producing articles of the aforementioned character, with a smoothly finished surface and without flash along the parting surface of the mold.

A particular object of the present invention is to produce the such injection molded articles economically and at high speed.

SUMMARY OF THE INVENTION

A method and apparatus for producing thermoplastic articles or products interlinked to form one or more continuous chains of articles, or webs of cross-linked continuous chains. A turret is cyclically indexed and carries the movable sections of the mold. The stationary section of the mold includes the sprue and gates through which the injected material is forced into the mold cavities. The turret is preferably moved away from the stationary mold section between molding cycles to permit it to be indexed and to thus carry the molded articles away from the molding station and to bring a different movable mold section into pressurized contact with the stationary mold section for every new cycle. Thus, when the thermoplastic material is injected into the cooperating mold sections in each cycle, it fuses onto the trailing edges of the articles produced in the preceding cycle. This fusion feature produces a continuous chain of interlinked articles.

BRIEF DESCRIPTION OF THE DRAWINGS

FIG. 5 is a sectional view of the mold sections used in the arrangement of FIG. 1 and shows the manner in which thermoplastic material is injected to form continuously interlinked articles;

FIG. 6 is a sectional view similar to FIG. 5 but showing the mold sections in the open position preparatory to the indexing of the turret;

FIG. 7 is a side view taken along line 7—7 in FIG. 6 and shows the means for confining the injected material at the trailing end of the mold cavities;

FIG. 8 is an end view of a turret formed with movable mold sections wherein a plurality of mold cavities are aligned in connecting end-to-end relationship in a plurality of lanes; and FIG. 9 is a section view corresponding to FIG. 5, showing another embodiment of the invention wherein a circular mold turret is utilized.

DESCRIPTION OF THE PREFERRED EMBODIMENT

Figure 1:
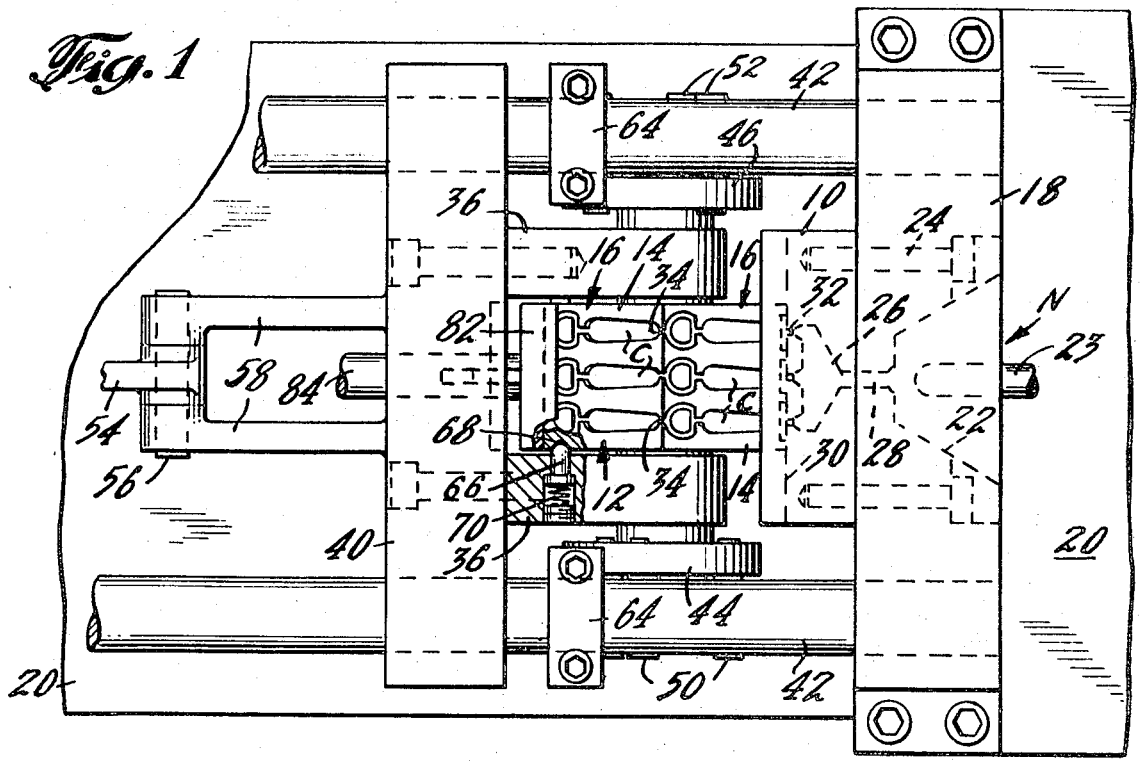
FIG. 1 is a plan view of the molding machine of the present invention, with the mold in closed position.

Referring to the drawing, a machine for forming articles A in accordance with the present invention, has a stationary mold closing portion or section 10 and a movable mold portion or turret 12 which is hexagonal in cross-section and is formed with six flat faces 14, each of which comprises a movable mold section 16. The stationary mold section 10 is secured to a support 18 bolted to the machine frame 20. The support 18 forms a portion of an injection nozzle generally designated as N. The latter is preferably conventional in construction and communicates with a conventional extruder (not shown).

The nozzle N includes a recess 22. It is the purpose of the injection nozzle N to inject it into the mold the plastic resin P of which the articles A are to be formed. Suitable means, such as a rod 23, are provided to close the nozzle N and stop the flow of resin P between injection cycles. The stationary portion 10 of the mold is held in alignment with respect to the injection nozzle N by bolts 24 (see FIG. 1) which secure the fixed mold section 10 to the fixed support 18.

The stationary mold section 10 includes an internal chamber 26 which communicates with the injection nozzle N through a sprue 28 in the form of a duct between the chamber 26 and the recess 22.

Mold cavities C (see FIG. 5) into which the melted polyethylene or other suitable plastic P is injected by the injection nozzle N to create the articles A, are defined by suitably shaped cavity walls in the turret 12 and are closed, when in molding position, by mating walls 30 in the stationary mold section 10, which latter walls 30 if desired may be suitably shaped to produce articles A which are contoured on both surfaces. In the drawings, the Articles A comprise sealing patches, each having a flat sealing pad portion B and a pull handle H.

Figure 2:
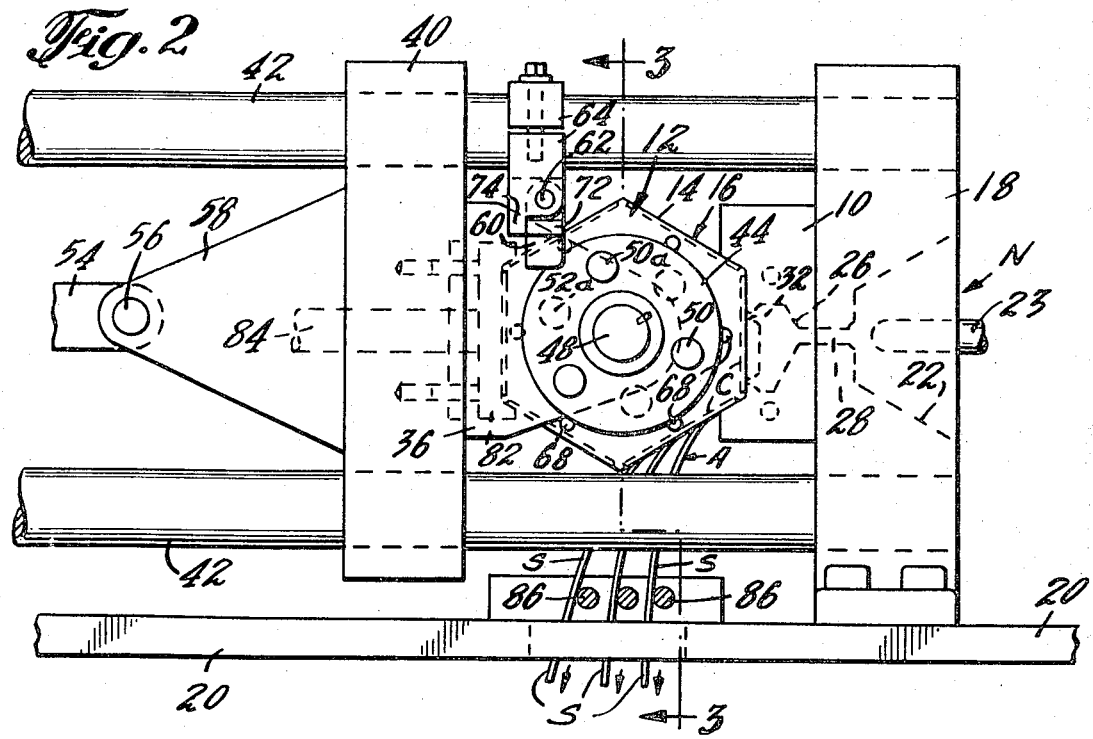
FIG. 2 is a side-elevational view of the machine of FIG. 1 and shows the design of the indexing mechanism for indexing the turret.

The polyethylene resin P filling the feed chamber 26 is forced into the mold cavities C through gates 32 to form a group of articles A each time the mold sections are in the closed position of FIGS. 1, 2 and 5.

In the illustrated embodiment of the present invention, the articles A formed within the mold cavities C are joined or linked together to form continuous strips S. The linking or joining of the articles A in each strip S is such that the articles may be readily severed from the continuous strip S through a simple shearing operation. Thus, each cavity C may be joined or linked to the cavities on the preceding and succeeding movable sections directly, or through narrow connecting cavity portions 34 which create readily severable runners R, between successive articles A.

The mold cavities C are, as shown, preferably so designed so that they produce a plurality of strips S adjacently located. If desired, the mold cavities C in each of the mold sections may be increased in number so that in addition to producing a plurality of strips S, a plurality of articles A, joined in end-to-end relationship, may be added to each strip S during each cycle of operation, as seen in FIG. 8. In this manner, a greater number of articles A may be simultaneously formed resulting in higher production rates.

Thus, for example, if eight strips S are produced, and four interconnected articles A are added onto each strip in each cycle, thirty-two articles A may be produced in each cycle.

Figure 3:
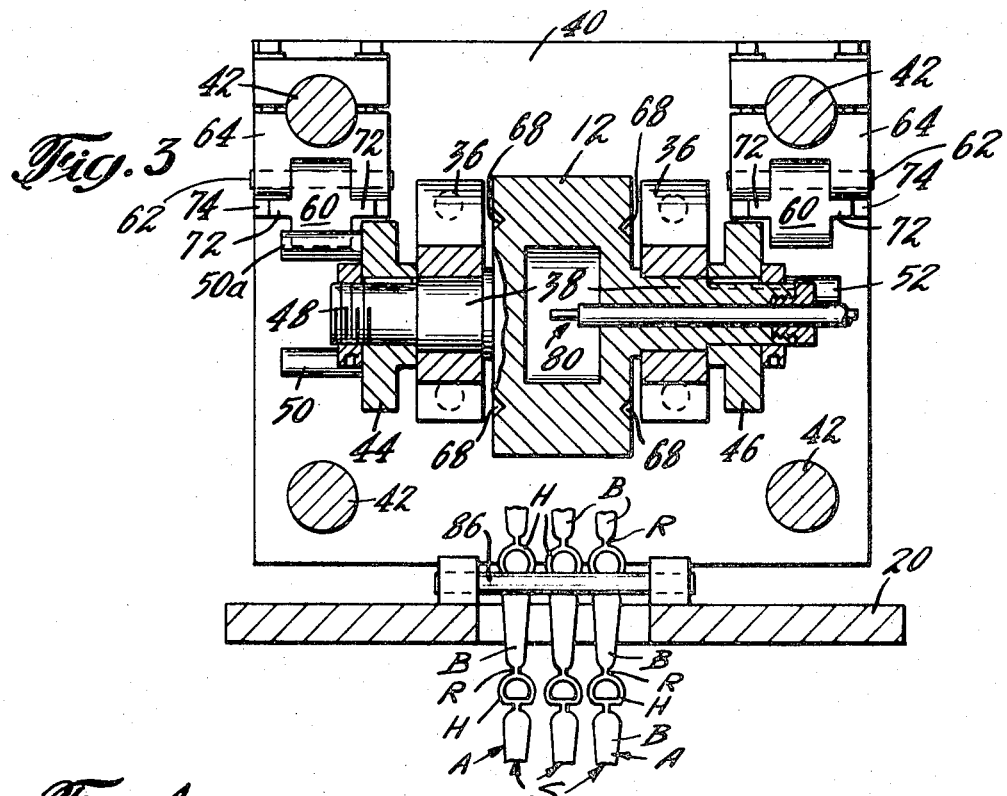
FIG. 3 is a sectional view taken along line 3—3 in FIG. 2.

The rotatable hexagonal turret 12 is indexed through 60° in each molding cycle. The turret 12 is rotatably supported in bearings 36 (see FIG. 3) through shaft portions 38 which extend from the turret and rotate within the bearings 36. The latter are bolted to a movable slide member 40 which is slidable along guide rods 42 fixed in relation to the support 18. The guide rods 42 assure that the slide 40 is, at all times, properly aligned with respect to the support 18, thereby assuring that the rotatable turret 12 is correctly aligned with respect to the fixed section 10 of the mold. The slide 40 moves the turret 12 firmly against the stationary mold section 10 to assure that the melted polyethylene resin being injected into the cavities C will not seep between the mold sections and thereby form a fin of flash around the articles A being molded.

For the purpose of indexing the turret 12, it is provided with indexing discs 44 and 46 which are keyed to lateral extensions 48 of the shafts 38. The indexing discs 44 and 46, therefore, rotate with the turret 12.

The indexing discs 44 and 46 each carry three indexing pins 50, 52, respectively, which project laterally from the discs. The indexing pins 50, 52 are distributed on the discs 44, 46 so that each disc carries its three pins equally spaced from each other on a circle concentric with the axis of rotation of the turret 12, (see FIG. 4), the pins on one disc being radially offset 60° from those on the other disc. Each indexing pin corresponds to one particular indexed position of the turret 12 and, therefore, the total of six indexing pins provides for the six possible indexed positions of the hexagonal turret 12.

To index the turret 12, the slide 40 is moved toward the left in FIGS. 1 and 2. Motion is imparted to the slide 40 through a reciprocating connecting rod 54 pivotably mounted at one end on a cross-pin 56 held within support brackets 58 fixed to the slide 40. When the connecting rod 54 is drawn on the left (see FIG. 4) by any suitable mechanism such as a crank (not shown), the slide 40 is, at the same time, also drawn to the left. As a result, the turret 12 is separated from the fixed mold section 10 and moved to the position shown in FIG. 4. During this rearward movement of the turret 12, the topmost indexing pin 50a (as seen in FIG. 2) is brought against one of a pair of stops 60 pivotally mounted on pivot pins 62 carried in mounting brackets 64 which are clamped in transversely aligned relationship onto the upper rods 42. This pin 50a contacts the stop 60 somewhat before the slide 40 reaches its leftmost position. As a result, the turret 12 is rotated clockwise during the rearward stroke of the slide 40.

Figure 4:
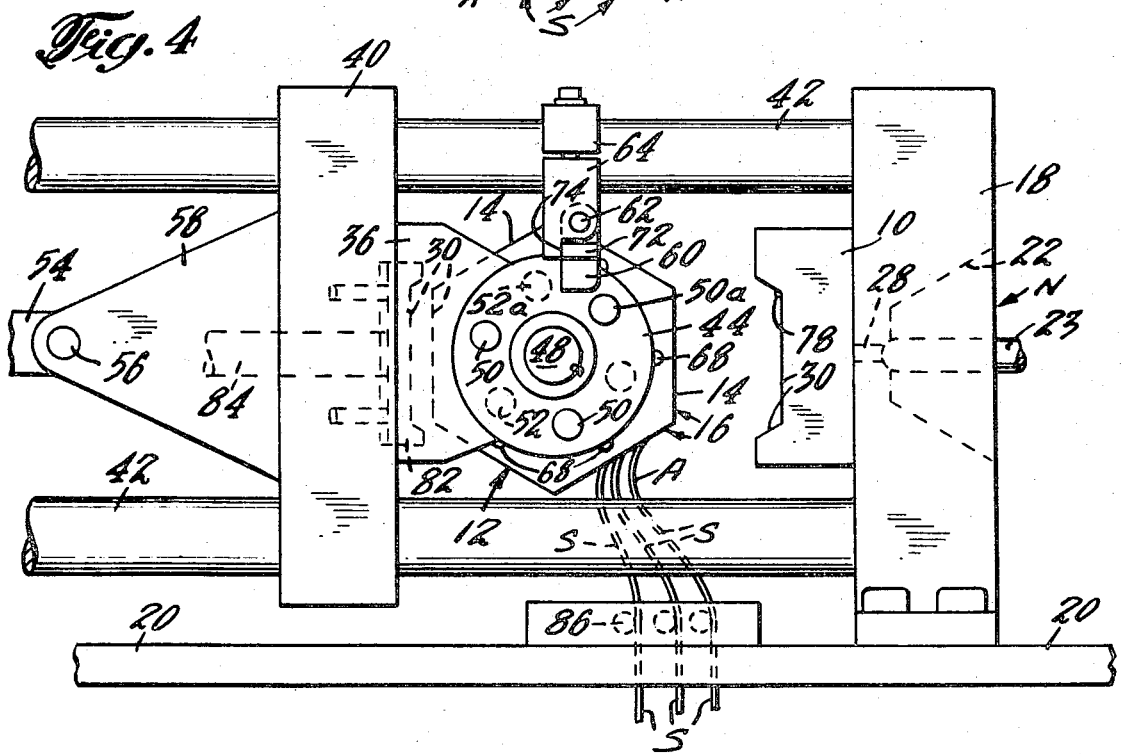
FIG. 4 is a side-elevational view similar to FIG. 2 but showing the mold in the open position.

This rotation of the turret 12 continues until the completion of the stroke of the slide 40, at which time the rotation of the pin causes it to move to the bottom corner of the stop 60, as seen in FIG. 4. At that point the turret 12 has been fully indexed 1/6 of a revolution and is in position for the next cycle of operation. Thus, the filled cavities C are removed from their position in alignment with the fixed mold section 10, and the empty cavities C of the succeeding movable mold section 14 are brought into operative position. Precision indexing of the turret 12 is assured by reason of a pair of latch pins 66 which snap into indexing indentations 68 on the sides of the turret 12 at the precisely indexed position of the turret. The latch pins 66 are maintained against the sides of the turret 12 by springs 70. The indentations 68 in the sides of the turret 12 are located so that one is provided for every indexing position of the turret to maintain the turret 12 in precise alignment with respect to the fixed mold portion 10.

As the pin marked 50a on disc 44 is rotated to the position of FIG. 4, the pin 52a on disc 46 is simultaneously moved from the position shown in FIG. 2 to the position shown on FIG. 4. As a result, this pin 52a is positioned to hit its associated pin stop 60 on next forward stroke of the connecting rod 54 (towards the right, as seen in the FIG. 4).

In order to prevent reverse rotation of the turret 12 when this occurs, both stops 60 are mounted for counter-clockwise rotation on the pins 62. Through the action of gravity, the stops 60 always normally assume the vertical position shown in FIGS. 2 and 4, and are held against further clockwise rotation by lateral lugs 72 which engage stop walls 74 on the brackets 64. They are, however, free to rotate in a counter-clockwise direction. As a result, on the forward stroke of the slide 40 (to the right) the pin 52a rotates the stop 60 about its pin 62 and lifts it out of its path as the turret 12 is moved to the right to bring the next movable mold section 16 into contact with the stationary mold portion 10 for the next injection molding operation.

On the subsequent rearward stroke of the rod 54, the turret 12 will be indexed as the pin 52a engages its stop 60 in the manner similar to that just described in relation to pin 50a.

Subsequent indexing operations are similarly effected as to other pins 50, 52 are successively presented to the stops 60.

In each molding operation, molten plastic is forced through the gates 32 and into the cavities C to form the articles A. Since the cavities C in each movable mold section 16 communicate with those in the adjacent movable mold sections in end-to-end relationship, the newly injected plastic material P is forced downwardly until it engages against the trailing edges E of the previously formed articles A and fuses with them, substantially along the broken line 76 as seen in FIG. 5, to add them to the strips S. While the line of fusion preferably takes place in the runner R and so may be discarded when the runner is severed or removed, it need not be so located. For example, the cavities C may be so arranged that they bridge two adjacent faces of the turret, in which event the fusion line would be located in an interior portion of an article A.

The upward flow of material is stopped by small plugs 78 which are carried by the fixed mold section 10 (see FIGS. 5, 6 and 7) and project into the narrow connecting portions 34 of the cavities C to block them. The plugs 78 engage or substantially engage, both the side and bottom walls of the portions 34.

The proper operating temperatures of the mold sections are maintained by the circulation of temperature controlled fluids through conduits 80 which are provided in both the turret 12 and the fixed mold section 10.

To insure that the turret 12 is held firmly against the fixed mold section 10 during the molding operation, a clamping head 82, mounted in the slide 40, is forced against the turret 12 by a rod 84 which is actuated by a suitable source of mechanical or hydraulic pressure. This engagement is preferably maintained only during the actual molding operation, and the clamping head is thereafter moved to its retracted position of FIG. 4 to free the turret 12 for its next indexing operation.

The rotation of the turret 12 causes the cavities C to carry the molded articles A away from the actual molding station, and the strips S of articles A are stripped from the turret 12 by being passed through stripper bars 86, the plastic P in the articles A having hardened before the stripping operation.

It is of course not essential that the strips S be separate from each other, since it is possible to link them together by transverse runners (not shown) to form a web which comprises a plurality of interlinked strips.

It is also not essential that the turret have the cross-sectional shape of a hexagon. It is generally desirable that it have the shape of a regular polygon, but it is also possible that it be circular in cross-section, as seen in FIG. 9, in which event its cylindrical surface would be divided into segments 14' of equal length which would contain the connected mold cavities and would correspond to the movable mold sections 14 of FIGS. 1–8. The fixed mold closing section 10' would be complementary in shape to the segments 14'. It will be noted that in FIG. 9, the numbered elements corresponding to those of FIGS. 1–8 have been primed.

It is thought that the invention and many of its attendant advantages will be understood from the foregoing description and it will be apparent that various changes may be made in the form, construction and arrangement of parts of the apparatus mentioned herein and in the steps and their order of accomplishment of process described herein, without departing from the spirit and scope of the invention or sacrificing all of its material advantages, the apparatus and process hereinbefore described being merely a preferred embodiment thereof.

I claim:

1. An injection molding apparatus comprising in combination,
    an injection molding station,
    a rotable turret,
    a plurality of moveable mold sections carried on the periphery of said turret,
    cavity means carried in each of said movable mold sections, said cavity means being interconnected with the cavity means on the immediately preceding and immediately succeeding movable mold sections,
    indexing means for intermittently rotating said turret to sequentially present said movable mold sections to said molding station,
    injection means for injecting a plastic material into a cavity means when the mold section on which said cavity means is carried is located at said molding station, whereby said plastic material is caused to flow into engagement with and fuse onto the trailing end of the injected material in the interconnected cavity means of the immediately preceding movable mold section, and
    plug means at said injection molding station insertable into portions of said cavities for damming the flow of plastic material into the mold cavities of the immediately succeeding mold section on said turret.

2. The injection molding apparatus of Claim 1 wherein said cavity means in each of said movable mold sections comprises a plurality of mold cavities.

3. The injection molding apparatus of claim 2 wherein the mold cavities on each movable mold section are circumferentially aligned in end to end relationship with each other and with the mold cavities of the immediately preceeding and the immediately succeeding mold sections.

4. The injection molding apparatus of claim 2 wherein mold closing means are provided at said injection molding station to close said cavity means.

5. The injection molding apparatus of claim 4 wherein said plug means are carried by said mold closing means and project into portions of said mold cavities to dam the flow of the injected material.

6. The injection molding apparatus of claim 5 wherein said mold closing means comprises a fixed mold section.

7. The injection molding apparatus of claim 4 wherein means are provided to move said turret bodily into contact with said mold closing means prior to the operation of said injection means and to move said turret bodily away from said mold closing means after the operation of said injection means to permit said indexing means to rotate said turret.

8. The injection molding apparatus of claim 7 wherein said turret has the cross-sectional configuration of a regular polygon and is formed with a series of flat faces, each of which comprises a movable mold section.

9. The injection molding apparatus of claim 7 wherein said turret is cylindrical, and wherein said mold sections comprise adjacent portions of the circular wall of said turret.

10. An injection molding apparatus, comprising in combination,
    an injection molding station,
    mold closing means disposed at said injection molding station,
    a rotatable turret,
    a plurality of movable mold sections carried on the periphery of said turret, a plurality of mold cavities formed in each of said mold sections, said mold cavities being interconnected with the mold cavities on the immediately preceeding and the immediately succeeding mold sections, means for rotatably indexing said turret to bring said mold sections sequentially into confronting relationship with said closing means at said injection molding station, means for bodily reciprocating said turret to move said mold sections into and out of contact with said closing means, injection means for injecting a plastic material into the mold cavities of a said mold section when said section is in contact with said closing means and for causing said material to fill said mold cavities and flow against and fuse onto the trailing edge portions of the plastic material in the mold cavities of the immediately preceeding mold section, and plug means at said injection molding station insertable into portions of said mold cavities for damming the flow of the plastic material into the mold cavities of the immediately succeeding mold section on said turret.

11. The apparatus of claim 10 wherein clamping means are provided to maintain pressured engagement between the movable mold sections and the closing means at the injection molding station.

* * * * *